(12) United States Patent
Watanabe et al.

(10) Patent No.: US 11,050,080 B2
(45) Date of Patent: Jun. 29, 2021

(54) ELECTROCHEMICAL CELL

(71) Applicants: Seiko Instruments Inc., Chiba (JP); OHARA INC., Sagamihara (JP)

(72) Inventors: Shunji Watanabe, Chiba (JP); Tsuneaki Tamachi, Chiba (JP); Kazuhito Ogasa, Sagamihara (JP); Ryohei Sato, Sagamihara (JP)

(73) Assignees: SEIKO INSTRUMENTS INC., Chiba (JP); OHARA INC., Kanagawa (JP)

( * ) Notice: Subject to any disclaimer, the term of this patent is extended or adjusted under 35 U.S.C. 154(b) by 228 days.

(21) Appl. No.: 15/175,182

(22) Filed: Jun. 7, 2016

(65) Prior Publication Data
US 2016/0372799 A1 Dec. 22, 2016

(30) Foreign Application Priority Data
Jun. 17, 2015 (JP) .............................. JP2015-121695

(51) Int. Cl.
*H01M 10/0562* (2010.01)
*H01M 10/0585* (2010.01)
(Continued)

(52) U.S. Cl.
CPC ..... *H01M 10/0562* (2013.01); *H01M 4/0404* (2013.01); *H01M 4/0471* (2013.01);
(Continued)

(58) Field of Classification Search
CPC ......... H01M 10/4235; H01M 10/0525; H01M 10/0562; H01M 10/0585; H01M 2/14;
(Continued)

(56) References Cited

U.S. PATENT DOCUMENTS

| | | | |
|---|---|---|---|
| 2001/0012193 A1* | 8/2001 | Watanabe | H01G 9/155 361/502 |
| 2004/0157121 A1* | 8/2004 | Watanabe | H01M 2/0426 429/185 |

(Continued)

FOREIGN PATENT DOCUMENTS

| | | |
|---|---|---|
| JP | S58-107567 U | 7/1983 |
| JP | S64-035871 A | 2/1989 |

(Continued)

OTHER PUBLICATIONS

Office Action in Japan Application No. 2015-121695, dated Mar. 26, 2019, 8 pages.

*Primary Examiner* — Eugenia Wang
(74) *Attorney, Agent, or Firm* — Brinks Gilson & Lione (57) ABSTRACT

An electrochemical cell includes an all-solid-state electrode body in which a positive electrode layer and a negative electrode layer are laminated together through a solid electrolyte and an exterior body having a cavity in which the electrode body is stored. The exterior body has a first case and a second case which sandwich the electrode body and a sealing member that defines the cavity together with the first case and the second case by joining the first case and the second. The thermal expansion coefficients of the electrode body, the first case, the second case, and the sealing member are all $10 \times 10^{-6}/°$ C. or lower.

12 Claims, 4 Drawing Sheets

(51) Int. Cl.
  *H01M 10/0525*  (2010.01)
  *H01M 50/116*  (2021.01)
  *H01M 50/103*  (2021.01)
  *H01M 50/186*  (2021.01)
  *H01M 50/159*  (2021.01)
  *H01M 50/117*  (2021.01)
  *H01M 50/131*  (2021.01)
  *H01M 50/198*  (2021.01)
  *H01M 50/119*  (2021.01)
  *H01M 50/15*  (2021.01)
  *H01M 50/191*  (2021.01)
  *H01M 50/474*  (2021.01)
  *H01M 50/48*  (2021.01)
  *H01M 50/528*  (2021.01)
  *H01M 10/42*  (2006.01)
  *H01M 4/04*  (2006.01)
  *H01M 50/10*  (2021.01)
  *H01M 50/40*  (2021.01)
  *H01M 50/531*  (2021.01)

(52) U.S. Cl.
  CPC ... *H01M 10/0525* (2013.01); *H01M 10/0585* (2013.01); *H01M 10/4235* (2013.01); *H01M 50/10* (2021.01); *H01M 50/103* (2021.01); *H01M 50/116* (2021.01); *H01M 50/117* (2021.01); *H01M 50/119* (2021.01); *H01M 50/131* (2021.01); *H01M 50/15* (2021.01); *H01M 50/159* (2021.01); *H01M 50/186* (2021.01); *H01M 50/191* (2021.01); *H01M 50/198* (2021.01); *H01M 50/40* (2021.01); *H01M 50/474* (2021.01); *H01M 50/48* (2021.01); *H01M 50/528* (2021.01); *H01M 50/531* (2021.01); *H01M 2220/30* (2013.01)

(58) Field of Classification Search
  CPC .. H01M 2/0207; H01M 2/026; H01M 2/0285; H01M 4/0404; H01M 4/0471; H01M 2220/30
  See application file for complete search history.

(56) References Cited

U.S. PATENT DOCUMENTS

| | | | | |
|---|---|---|---|---|
| 2007/0175020 | A1* | 8/2007 | Nagata | B32B 18/00 29/623.3 |
| 2012/0040211 | A1* | 2/2012 | Murata | C03B 17/064 429/9 |
| 2012/0164540 | A1* | 6/2012 | Park | H01M 10/054 429/320 |
| 2012/0177997 | A1* | 7/2012 | Nakamoto | H01M 10/052 429/306 |
| 2012/0237820 | A1* | 9/2012 | Hagiwara | H01G 11/82 429/185 |
| 2013/0309551 | A1 | 11/2013 | Ogasa | |
| 2015/0132667 | A1* | 5/2015 | Sato | H01M 4/604 429/340 |

FOREIGN PATENT DOCUMENTS

| | | |
|---|---|---|
| JP | 2000-340255 A | 12/2000 |
| JP | 2004-079398 A | 3/2004 |
| JP | 2012-004103 A | 1/2012 |
| JP | 2012-069508 A | 4/2012 |
| JP | 2013-147418 A | 8/2013 |
| JP | 2013-243006 A | 12/2013 |
| JP | 2015-106517 A | 6/2015 |

* cited by examiner

ELECTROCHEMICAL CELL

RELATED APPLICATIONS

This application claims priority under 35 U.S.C. § 119 to Japanese Patent Application No. 2015-121695 filed on Jun. 17, 2015, the entire content of which is hereby incorporated by reference.

FIELD OF THE INVENTION

The present invention relates to an electrochemical cell.

DESCRIPTION OF RELATED ART

In power sources for a variety of devices, electrochemical cells such as secondary batteries and capacitors are used. Electrochemical cells include an electrode body formed by interposing an electrolyte between a positive electrode layer and a negative electrode layer and an exterior body storing the electrode body. The exterior body includes a first case, a second case, and a sealing member that defines a cavity which stores the electrode body together with the first case and the second case by joining the first case and the second case.

In electrochemical cells, the positive electrode layer and the negative electrode layer in the electrode body are electrically connected to the outside through the exterior body or a penetration electrode formed in the exterior body.

Here, as the above-described electrode body, for example, a so-called all-solid-state electrode body in which a solid electrolyte is interposed between a positive electrode layer and a negative electrode layer as described in Patent Document 1 is known. In all-solid-state electrode bodies, unlike electrode bodies in which a liquid electrolyte or a polymer electrolyte is used, there is no concern of the leakage, depletion, and the like of the electrolyte, and thus there is an advantage in the extension of the service life and the like.

[Patent Document 1] Japanese Unexamined Patent Application, First Publication No. 2013-243006

SUMMARY OF THE INVENTION

Meanwhile, in electrochemical cells in which an all-solid-state electrode body is used, in order to ensure conduction properties, it is necessary to closely attach a conduction portion of an exterior body (the exterior body itself, a penetration electrode, or the like) to an electrode body.

However, when the thermal expansion coefficient of the electrode body and the thermal expansion coefficient of the exterior body (individual cases and a sealing member) become significantly different from each other, during cooling after a heating treatment, for example, during the joining of the respective cases or the sealing member or the mounting of the electrochemical cell by means of reflow, the contraction amount of the electrode body and the contraction amount of the exterior body become significantly different. In this case, there are concerns that voids may be generated between the electrode body and the conduction portion of the exterior body or between the respective cases and the sealing member or the electrode body may be cracked due to stress being exerted between the electrode body and the exterior body. Therefore, in electrochemical cells of the related art, there has been room for improvement in ensuring conduction properties and sealing properties.

Particularly, in small-size electrochemical cells that are used in watches, electronic components, and the like, in order to improve current rates, temperature characteristics, and the like, there are cases in which a plurality of positive electrode layers and a plurality of negative electrode layers are laminated together. Therefore, the respective layers of the positive electrode layers and the negative electrode layers become thin, and there is a tendency for the strength of the electrode body to become low.

The present invention was made in view of the above-mentioned circumstances, and has an object of providing an electrochemical cell having a long service life and high reliability by ensuring conduction properties or sealing properties.

In order to solve the above-described problems, the present invention employed the following aspects.

(1) That is, an electrochemical cell according to an aspect of the present invention includes an all-solid-state electrode body in which a positive electrode layer and a negative electrode layer are laminated together through a solid electrolyte and an exterior body having a cavity in which the electrode body is stored, in which the exterior body has a first case and a second case which sandwich the electrode body and a sealing member that defines the cavity together with the first case and the second case by joining the first case and the second case, and thermal expansion coefficients of the electrode body, the first case, the second case, and the sealing member are all $10 \times 10^{-6}$/° C. or lower.

According to the above-described aspect, since differences between the thermal expansion coefficients of the electrode body, the first case, the second case, and the sealing member become small, it is possible to decrease the difference in contraction amount, for example, during cooling after the above-described heating treatment. Therefore, it is possible to reliably join the respective cases and the sealing member and to improve sealing properties. In addition, since it is possible to reduce stress being exerted between the electrode body and the exterior body, the generation of cracks in the electrode body is suppressed, and thus the electrode body and the respective cases are closely attached together, and conduction properties can be ensured between the electrode body and the respective cases.

Therefore, it is possible to provide an electrochemical cell having a long service life and high reliability by ensuring sealing properties or conduction properties.

(2) In the aspect according to (1), the first case and the second case may be formed of a metallic material, and the sealing member may be formed of a glass material.

In this case, since the first case and the second case formed of a metallic material are joined together using the sealing member formed of a glass material, it is possible to provide an electrochemical cell which has excellent sealing properties or conduction properties and has a long service life and high reliability.

(3) In the aspect according to (1), the first case may include a base substrate formed of a ceramic material, and the second case and the sealing member may be formed of a metallic material.

In this case, it is possible to provide an electrochemical cell which has excellent sealing properties or conduction properties and has a long service life and high reliability.

(4) In the aspect according to (1), the second case may have a joining portion which is located in an outer circumferential portion of the second case and is joined to the sealing member, a sandwiching portion which is located in an inner circumferential portion of the second case and sandwiches the electrode body with the first case, and a spring portion which couples the joining portion and the sandwiching portion and urges the sandwiching portion toward the first case.

In this case, since the second case has the spring portion that urges the sandwiching portion toward the first case, stress being exerted between the electrode body and the exterior body which is caused by a difference in thermal expansion coefficient between the electrode body and the exterior body is mitigated, and the generation of cracks in the electrode body can be reliably suppressed. Furthermore, it is possible to absorb a change in the volume of the electrode body and the tolerances of the electrode body and the exterior body which are caused during cooling after the above-described heating treatment or by charging and discharging using elastic deformation of the spring portion. Therefore, the generation of cracks in the electrode body is suppressed, and thus adhesiveness between the respective cases and the electrode body is maintained, and conduction properties between the respective cases and the electrode body can be ensured.

(5) In the aspect according to (1), a cushion material may be interposed, at one of or both of, between the electrode body and the first case, and between the electrode body and the second case.

In this case, stress being exerted between the electrode body and the exterior body which is caused by a difference in thermal expansion coefficient therebetween is mitigated, and the generation of cracks in the electrode body can be reliably suppressed. Furthermore, it is possible to absorb a change in the volume of the electrode body and the tolerances of the electrode body and the exterior body which are caused during cooling after the above-described heating treatment or by charging and discharging using deformation of the cushion material. Therefore, the generation of cracks in the electrode body is suppressed, and thus adhesiveness between the respective cases and the electrode body is maintained, and conduction properties between the respective cases and the electrode body can be ensured.

Effect of the Invention

According to the respective aspects of the present invention, it is possible to provide an electrochemical cell having a long service life and high reliability by ensuring conduction properties or sealing properties.

DETAILED DESCRIPTION OF THE INVENTION

Hereinafter, individual embodiments according to the present invention will be described with reference to the accompanying drawings. In the following description, as an electrochemical cell according to an aspect of the present invention, a secondary battery having an all-solid-state electrode body will be described. In the drawings used in the following description, the scales of individual members are appropriately changed in order to show the members large enough to be recognized.

First Embodiment

Secondary Battery

Figure 1:
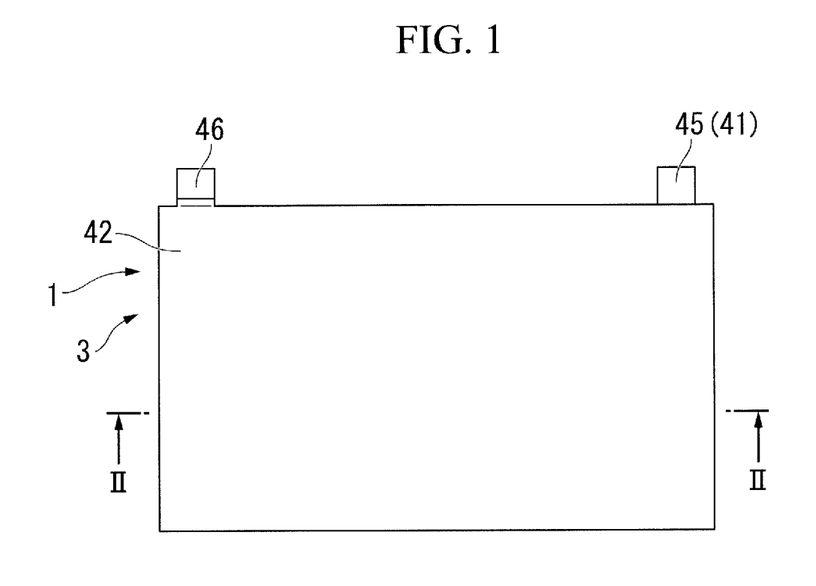
FIG. 1 is a plan view of a secondary battery according to a first embodiment of the present invention.
Figure 2:
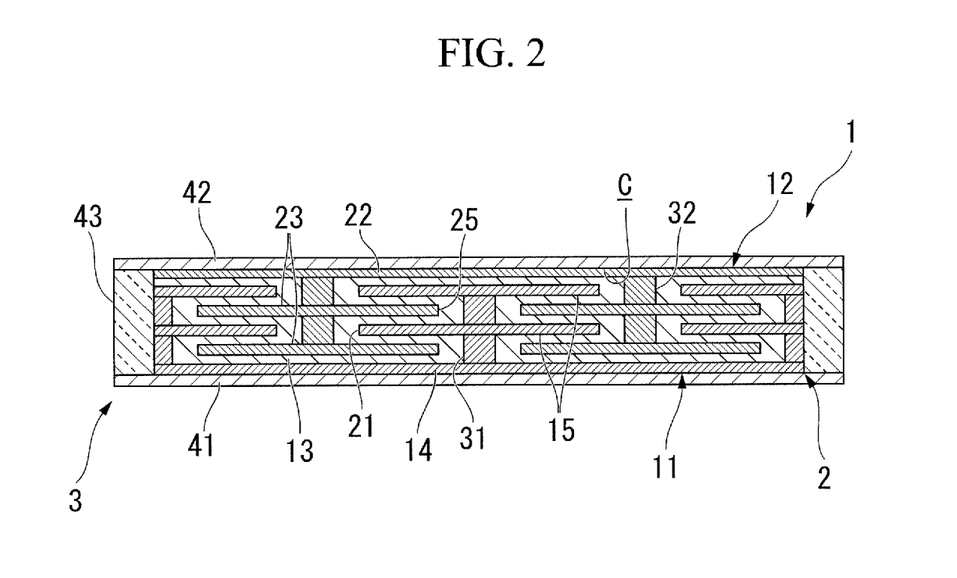
FIG. 2 is a sectional view in a direction of a II-II line in FIG. 1.

FIG. 1 is a plan view of a secondary battery 1. FIG. 2 is a sectional view in a direction of a II-II line in FIG. 1.

As shown in FIGS. 1 and 2, the secondary battery 1 of the present embodiment includes an electrode body 2 and an exterior body 3 having a cavity C that stores the electrode body 2.

<Electrode Body>

As shown in FIG. 2, the electrode body 2 is a so-called all-solid-state electrode body 2. The electrode body 2 is constituted of positive electrode layers 11 including a positive electrode active material and negative electrode layers 12 including a negative electrode active material which are alternately laminated through a solid electrolyte layer 13. The number of the positive electrode layers 11 laminated and the number of the negative electrode layers 12 laminated are the same as each other.

The positive electrode layer 11 has a positive electrode collection layer 14 and positive electrode connection layers 15.

The positive electrode collection layer 14 constitutes a first end portion (the bottom layer) of the electrode body 2 in the lamination direction.

The positive electrode connection layers 15 are disposed between the solid electrolyte layers 13, respectively. In the positive electrode connection layer 15, relief holes 21 penetrating the positive electrode connection layer 15 in the lamination direction are formed. The relief holes 21 are formed at intervals in an in-plane direction perpendicular to the lamination direction in the positive electrode connection layer 15.

The positive electrode layer 11 includes the above-described positive electrode active material or solid electrolyte, a conductive assistant, and the like.

The positive electrode active material is preferably, for example, NASICON-type $LiV_2(PO_4)_3$, olivine-type $Li_xJ_yMtPO_4$ (here, J represents at least one element selected from Al, Mg, and W, Mt represents one or more elements selected from Ni, Co, Fe, and Mn, $0.9 \leq x \leq 1.5$, and $0 \leq y \leq 0.2$), a lamellar oxide, or a spinel-type oxide. Among these, particularly, the positive electrode active material is more preferably formed of $LiMtO_2$ and/or $LiMt_2O_4$ (here, Mt represents one or more elements selected from Ni, Co, Fe, and Mn). In such a case, the positive electrode active material becomes capable of easily absorbing lithium ions, and thus it is possible to further increase the discharge capacity of the all-solid-state secondary battery 1. Specific examples of the positive electrode active material that can be used include $LiCoPO_4$, $LiCoO_2$, and $LiMn_2O_4$.

As the solid electrolyte, lithium ion-conductive glass or crystals can be preferably used. Among these, examples of the lithium ion-conductive crystals include crystals of oxides selected from NASICON-type oxides, $\beta$-$Fe_2(SO_4)_3$-type oxides, and perovskite-type oxides. More specific examples thereof include $Li_6BaLa_2Ta_2O_{12}$, LiN, $La_{0.55}Li_{0.35}TiO_3$, $Li_{1+x}Al_x(Ti, Ge)_{2-x}(PO_4)_3$, $LiTi_2P_3O_{12}$, $Li_{1.5}Al_{0.5}Ge_{1.5}(PO_4)_3$, $Li_{1+x+y}Zr_{2-x}(Al, Y)_xSi_yP_{3-y}O_{12}$ (here, $0.05 \leq x \leq 0.3$, $0.05 \leq y \leq 0.3$), and the like. Among these, $Li_{1+x+z}E_yG_{2-j}Si_zP_{3-y}O_{12}$ (here, j, x, y, and z satisfy $0 \leq x \leq 0.8$ and $0 \leq z \leq 0.6$, y satisfies $0 \leq j \leq 0.6$, j satisfies $0 \leq j \leq 0.6$, E is one or more element selected from Al, Ga, Y, Sc, Ge, Mg, Ca, Ce, and Sm, and G is one or more element selected from Ti and Zr) is preferred.

Examples of the lithium ion-conductive glass include $LiPO_3$, $70LiPO_3$-$30Li_3PO_4$, $Li_2O$—$SiO_2$, $Li_2O$—$SiO_2$—$P_2O_5$—$B_2O_5$—BaO-based amorphous or polycrystalline glass. Among these, particularly, one or more glass selected from $Li_2O$—$P_2O_5$-based glass and $Li_2O$—$P_2O_5$-$M'_2O_3$-based glass (including glass in which P is substituted with Si. M' represents Al or B.) is preferred.

As the conductive assistant, it is possible to use carbon, metals made of at least one element of Ni, Fe, Mn, Co, Mo, Cr, Ag, and Cu, and alloys thereof. Metals such as titanium, stainless steel, and aluminum or noble metals such as platinum, silver, gold, and rhodium may be used. When the above-described highly electron-conductive material is used as the conductive assistant, the amount of current that can be conducted through a narrow electron conduction path formed in the positive electrode layer 11 increases, and thus it is possible to form the secondary battery 1 having a small internal resistance without using any collector.

The negative electrode layer 12 has a negative electrode collection layer 22 and negative electrode connection layers 23.

The negative electrode collection layer 22 constitutes a second end portion (the top layer) of the electrode body 2 in the lamination direction.

The negative electrode connection layers 23 are laminated on both sides of the above-described positive electrode connection layer 15 in the lamination direction through the solid electrolyte layers 13. In the negative electrode connection layer 23, relief holes 25 penetrating the negative electrode connection layer 23 in the lamination direction are formed. The relief holes 25 are formed at intervals in the above-described in-plane direction in the negative electrode connection layer 23. In the present embodiment, the relief holes 21 and 25 in the positive electrode connection layer 15 and the negative electrode connection layer 23 have the same internal diameter and are formed at locations at which the relief holes are not overlapped with the relief holes 21 and 25 in the connection layers 15 and 23 of a different polarity in the lamination direction. In the following description, there are cases in which a direction toward the first end portion of the electrode body 2 in the lamination direction is referred to as downwards and a direction toward the second end portion is referred to as upwards.

The negative electrode layer 12 includes the above-described negative electrode active material or solid electrolyte, a conductive assistant, and the like.

The negative electrode active material is preferably at least one or more material selected from oxides including NASICON-type, olivine-type, or spinel-type crystals, rutile-type oxides, anatase-type oxides, amorphous metal oxides, metal alloys, and the like. Among these, particularly, the negative electrode active material is more preferably made of $Li_{1+x+y}Al_yTi_2Si_zP_{3-z}O_{12}$ (here, x, y, and z satisfy $0 \leq x \leq 0.8$ and $0 \leq z \leq 0.6$, and y satisfies $Li_4Ti_5O_{12}$, or $TiO_2$. In such a case, the negative electrode active material becomes capable of easily absorbing lithium ions, and thus it is possible to further increase the discharge capacity of the secondary battery 1. Specific examples of the negative electrode active material that can be used include $Li_2V_2(PO_4)_3$, $Li_2Fe_2(PO_4)_3$, $LiFePO_4$, $Li_4Ti_5O_{12}$, $SiO_x$ ($0.25 \leq x \leq 2$), and $Cu_6Sn_5$.

The solid electrolyte layers 13 are interposed between the positive electrode layer 11 and the negative electrode layer 12 and separate the positive electrode layer 11 and the negative electrode layer 12. The solid electrolyte layers 13 in the present embodiment are also formed in the relief holes 21 and 25 in the respective connection layers 15 and 23 described above.

The electrode body 2 has a positive electrode via 31 that connects the respective positive electrode layers 11 (the positive electrode collection layer 14 and the positive electrode connection layers 15) together in parallel and a negative electrode via 32 that connects the respective negative electrode layers 12 (the negative electrode collection layer 22 and the negative electrode connection layers 23) together in parallel.

The positive electrode via 31 is provided so as to extend in the lamination direction of the electrode body 2. The positive electrode via 31 connects the respective positive electrode connection layers 15 and the positive electrode collection layer 14 through the relief holes 25 in the negative electrode connection layers 23. The outer diameter of the positive electrode via 31 is smaller than the inner diameter of the relief hole 25 in the negative electrode connection layer 23. The positive electrode via 31 is separated from the negative electrode connection layers 23 through the solid electrolyte layers 13 in the relief holes 25.

The negative electrode via 32 is provided so as to extend in the lamination direction of the electrode body 2. The negative electrode via 32 connects the respective negative electrode connection layers 23 and the negative electrode collection layers 22 through the relief holes 21 in the positive electrode connection layers 15. The outer diameter of the negative electrode via 32 is smaller than the inner diameter of the relief hole 21 in the positive electrode connection layer 15. The negative electrode via 32 is separated from the positive electrode connection layers 15 through the solid electrolyte layers 13 in the relief holes 21.

<Exterior Body>

The exterior body 3 includes a first case 41, a second case 42, and a sealing member 43.

The first case 41 and the second case 42 sandwich the electrode body 2 in the lamination direction.

The sealing member 43 joins the first case 41 and the second case 42 together.

The first case 41 is formed of a conductive metallic material. The first case 41 is a flat plate. The outer shape of the first case 41 is formed in a rectangular shape that is larger than the electrode body 2 in a planar view seen from the lamination direction. The first case 41 is disposed below the electrode body 2. The positive electrode collection layer 14 of the electrode body 2 is connected to the upper surface of the first case 41. That is, the first case 41 is electrically connected to the positive electrode layer 11 through the positive electrode collection layer 14.

The second case 42 is formed of a conductive metallic material. The second case 42 is a flat plate. The outer shape of the second case 42 is formed in a rectangular shape that is as large as the first case 41 in a planar view seen from the lamination direction. The second case 42 is disposed above the electrode body 2. The negative electrode collection layer 22 of the electrode body 2 is connected to the lower surface of the second case 42. That is, the second case 42 is electrically connected to the negative electrode layer 12 through the negative electrode collection layer 22. Thermosetting conductive paste (not shown in the figures) including a carbon-based material may be interposed respectively between the cases 41 and 42 and the electrode body 2.

As shown in FIG. 1, a positive electrode tab 45 is formed on the first case 41. The positive electrode tab 45 is constituted of a part of the outer circumferential portion of the first case 41 which is provided so as to extend in the in-plane direction perpendicular to the lamination direction.

A negative electrode tab 46 is formed on the second case 42. The negative electrode tab 46 is constituted of a part of the outer circumferential portion of the second case 42 which is bent downwards and then is provided so as to extend onto the same surface as the positive electrode tab 45. The respective tabs 45 and 46 are mounted on an external substrate, not shown in the figures, using connection members (solders, screws, or the like), not shown in the figures.

As shown in FIG. 2, the sealing member 43 is formed in a casing shape that surrounds the circumference of the electrode body 2 in the outer circumferential portions (regions outside the electrode body 2) of the respective cases 41 and 42. The sealing member 43 joins the outer circumferential portions of the respective cases 41 and 42 together in the lamination direction. A space defined by the respective cases 41 and 42 and the sealing member 43 constitutes a cavity C that air-tightly seals the electrode body 2. In the example of the drawing, the sealing member 43 and the outer circumferential portion of the electrode body 2 are closely attached together in the in-plane direction, but the constitution is not limited thereto, and a gap may be provided in the in-plane direction between the sealing member 43 and the electrode body 2.

Here, in the present embodiment, the respective components of the electrode body 2 and the exterior body 3 are constituted of materials all having a thermal expansion coefficient of $10 \times 10^{-6}/°$ C. or lower.

In this case, for the respective cases 41 and 42 in the exterior body 3, it is possible to employ kovar (substantially $5 \times 10^{-6}/°$ C.), invar ($2 \times 10^{-6}/°$ C. or lower), super invar ($1 \times 10^{-6}/°$ C. or lower), stainless invar ($1 \times 10^{-6}/°$ C. or lower), 42 alloy (substantially $7 \times 10^{-6}/°$ C.), 46 alloy (substantially $8.5 \times 10^{-6}/°$ C.), or the like as a metallic material having a thermal expansion coefficient of $10 \times 10^{-6}/°$ C. or lower (the temperature range is 20° C. to 350° C. for all the metallic materials).

In the exterior body 3, for the sealing member 43, for example, a glass material is preferably used as a material having a thermal expansion coefficient of $10 \times 10^{-6}/°$ C. or lower (the temperature range is 100° C. to 300° C.).

[Method for Manufacturing Secondary Battery]

Next, a method for manufacturing the above-described secondary battery 1 will be described.

The method for manufacturing the above-described secondary battery 1 of the present embodiment has an electrode body formation step and a sealing step of sealing the electrode body 2 using the exterior body 3.

<Electrode Body Formation Step>

The electrode body formation step has a positive electrode sheet production step and a negative electrode sheet production step, a lamination step, and a thermal pressing step.

(Positive Electrode Sheet Production Step)

In the positive electrode sheet production step, a raw material composition of the positive electrode layer 11 is applied onto a base material, thereby forming a positive electrode green sheet. After that, opening portions are formed in portions corresponding to the relief holes 21 in the positive electrode layer 11 out of the positive electrode green sheet which serves as the positive electrode connection layer 15. Next, a raw material composition of the solid electrolyte layer 13 is applied to regions excluding portions corresponding to the relief holes 25 in the negative electrode layer 12 out of the positive electrode green sheet which serves as the positive electrode connection layer 15. The above-described green sheet refers to an unfired body of glass powder or crystal (ceramics or glass ceramics) powder which is formed in a thin plate shape. Specifically, the green sheet in the present embodiment refers to a sheet obtained by molding a slurry or paste, which is obtained by mixing the raw material compositions of the respective electrode layers (the positive electrode layer 11 and the negative electrode layer 12) or the solid electrolyte layer 13 into an organic binder, a solvent, or the like, in a thin plate shape. The scope of the green sheet in the present embodiment also includes other green sheets and sheets obtained by applying the raw material composition to fired bodies of other green sheets.

(Negative Electrode Sheet Production Step)

In the negative electrode sheet production step, the raw material composition of the negative electrode layer 12 is applied onto a base material, thereby forming a negative electrode green sheet. After that, opening portions are formed in portions corresponding to the relief holes 25 in the negative electrode layer 12 out of the negative electrode green sheet which serves as the negative electrode connection layer 23. Next, the raw material composition of the solid electrolyte layer 13 is applied to regions excluding portions corresponding to the relief holes 21 in the positive electrode layer 11 out of the negative electrode green sheet which serves as the negative electrode connection layer 23.

(Lamination Step)

In the lamination step, the positive electrode sheets and the negative electrode sheets produced in the positive electrode sheet production step and the negative electrode sheet production step are laminated together. Specifically, in the lamination step, the positive electrode sheets and the negative electrode sheets are alternately laminated so that the portions corresponding to the relief holes 21 in the positive electrode layer 11 are overlapped with each other in the lamination direction and the portions corresponding to the relief holes 25 in the negative electrode layer 12 are overlapped with each other in the lamination direction.

(Degreasing Step)

Next, a degreasing step in which the laminate of the positive electrode sheet and the negative electrode sheets produced in the lamination step is heated and an organic binder component in the laminate is gasified and removed is carried out. Therefore, carbon remaining in the solid electrolyte after the subsequent thermal pressing step is reduced, and short-circuiting (electron conduction in the solid electrolyte) can be prevented.

(Thermal Pressing Step)

In the thermal pressing step, the laminate of the positive electrode sheet and the negative electrode sheets is fired. Specifically, in the thermal pressing step, the laminate is heated under pressurization in the lamination direction, whereby, in the laminate, adjacent positive electrode sheets sandwiching the negative electrode sheet come into contact with each other in the lamination direction through the portions corresponding to the relief holes 25 in the negative electrode layer 12. On the other hand, in the laminate, adjacent negative electrode sheets sandwiching the positive electrode sheet come into contact with each other in the lamination direction through the portions corresponding to the relief holes 21 in the positive electrode layer 11.

The above-descried electrode body 2 is completed in the above-described manner.

<Sealing Step>

In the sealing step, for example, conductive paste, not shown in the figures, is applied onto the first case 41, and then the electrode body 2 is set on the first case 41. After that, the conductive paste is dried, thereby temporarily reserving the electrode body 2.

On the other hand, conductive paste, not shown in the figures, is applied onto the lower surface of the second case 42, and then the conductive paste is dried.

Next, the first case 41 and the second case 42 are superimposed with the electrode body 2 sandwiched therebetween, and then the outer circumferential portions of the respective cases 41 and 42 are filled with the powder-form or paste-form sealing member 43 (glass material). After that, the sealing member 43 is heated, whereby the respective cases 41 and 42 are thermally fused together through the sealing member 43. Therefore, the electrode body 2 is air-tightly sealed in the cavity C defined by the respective cases 41 and 42 and the sealing member 43, and the above-described secondary battery 1 is completed.

As described above, in the constitution of the present embodiment, the thermal expansion coefficients of the electrode body 2 and the exterior body 3 are $10 \times 10^{-6}/°$ C. or lower.

According to this constitution, since the difference in thermal expansion coefficient between the respective components becomes small, it is possible to decrease the difference in contraction amount during cooling after the heating treatment, for example, in the above-described sealing step or during the mounting of the secondary battery 1 by means of reflow. Therefore, it is possible to reliably join the respective cases 41 and 42 and the sealing member 43 and to improve sealing properties. In addition, since it is possible to reduce stress being exerted between the electrode body 2 and the exterior body 3, the generation of cracks in the electrode body 2 is suppressed, and thus the electrode body 2 and the respective cases 41 and 42 are closely attached together, and conduction properties can be ensured between the electrode body 2 and the respective cases 41 and 42.

Therefore, it is possible to provide the secondary battery 1 having a long service life and high reliability by ensuring sealing properties or conduction properties.

In the present embodiment, the first case 41 and the second case 42 which are formed of a metallic material are joined together using the sealing member 43 formed of a glass material. Therefore, it is possible to provide the secondary battery 1 which has excellent sealing properties or conduction properties and has a long service life and high reliability.

In the above-described embodiment, it has been described that, in the sealing step, the respective cases 41 and 42 are adhered to the electrode body 2 fired in the thermal pressing step through the conductive paste, but the constitution is not limited thereto. That is, in the thermal pressing step, the firing of the electrode body 2 (the laminate) and the adhesion of the electrode body 2 and the respective cases 41 and 42 may be carried out at the same time. Specifically, first, the electrode body 2 is sandwiched by the first case 41 and the second case 42. After that, the first case 41, the second case 42, and the electrode body 2 are collectively heated under pressurization. Therefore, it is possible to fire the electrode body 2 and adhere the electrode body 2 and the respective cases 41 and 42.

In this case, it is possible to improve the manufacturing efficiency. Since it is not necessary to use conductive paste for adhesion between the electrode body 2 and the respective cases 41 and 42, it is also possible to reduce material costs. In the present embodiment, since the thermal expansion coefficients of the electrode body 2 and the exterior body 3 are $10 \times 10^{-6}/°$ C. or lower as described above, it is also possible to reduce stress being exerted between the electrode body 2 and the respective cases 41 and 42 during contraction after the thermal pressing step. As a result, the generation of cracks in the electrode body 2 is suppressed, and thus the electrode body 2 and the respective cases 41 and 42 are closely attached together, and conduction properties can be ensured between the electrode body 2 and the respective cases 41 and 42.

Second Embodiment

Figure 3:
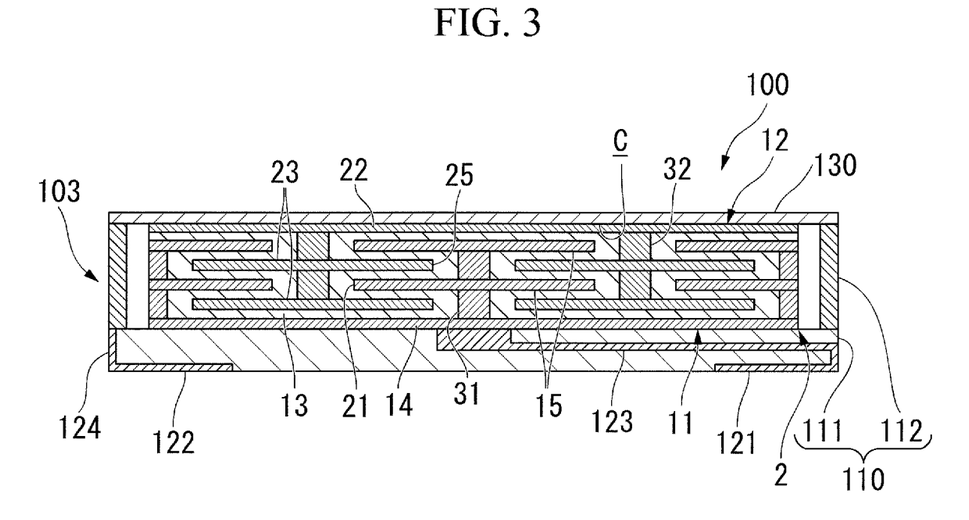
FIG. 3 is a view showing a secondary battery according to a second embodiment of the present invention and is a sectional view corresponding to FIG. 2.

Next, a second embodiment of the present invention will be described. The difference of the present embodiment from the above-described first embodiment is that a ceramics package is used for an exterior body 103. In the following description, there are cases in which the same constitution as that of the above-described first embodiment will be given the same reference number and will not be described again. FIG. 3 is a sectional view of a secondary battery 100 according to the second embodiment.

In the secondary battery 100 shown in FIG. 3, a first case 110 in the exterior body 103 has a base substrate 111 and a seal ring 112.

The base substrate 111 is formed of a ceramic material.

The seal ring 112 is formed of a conductive metallic material. The seal ring 112 is formed in a frame shape. The seal ring 112 is joined to the upper surface of the base substrate 111 using a brazing filler metal (silver brazing filler metal or the like).

A pair of external electrodes 121 and 122 is formed on the lower surface of the first case 110. A penetration electrode 123 that penetrates the base substrate 111 in the thickness direction is connected to one external electrode 121. A penetration electrode 124 that penetrates the base substrate 111 in the thickness direction is connected to the other external electrode 122.

Out of the respective penetration electrodes 123 and 124, one penetration electrode 123 is exposed on the base substrate 111 in a cavity C. The other penetration electrode 124 is connected to the seal ring 112 outside the cavity C.

A second case 130 is formed of a conductive metallic material. The second case 130 is formed in a flat plate shape. The second case 130 is joined onto the seal ring 112 and thus blocks the first case 110. In this case, the joining portion between the seal ring 112 and the second case 130 corresponds to the sealing member in the present embodiment. That is, the sealing member in the present embodiment is constituted of the same material as the constitutional material of the seal ring 112 or the second case 130. In addition, a portion defined by the first case 110 and the second case 130 constitutes a cavity C that air-tightly seals the electrode body 2.

The electrode body 2 is sandwiched by the base substrate 111 in the first case 110 and the second case 130 in the cavity C in the lamination direction. In this case, the positive electrode collection layer 14 is connected to the penetration electrode 123 on the base substrate 111. The negative electrode collection layer 22 is connected to the penetration electrode 124 through the second case 130 and the seal ring 112.

Here, in the present embodiment, the exterior body 103 is constituted of a material having a thermal expansion coefficient of $10 \times 10^{-6}/°$ C. or lower. In the exterior body 103, the base substrate 111 is constituted of, for example, alumina (substantially $7 \times 10^{-6}/°$ C. or lower: the temperature range is in a range of 20° C. to 350° C.) or the like. The seal ring 112 or the second case 130 is constituted of the same material as the respective cases 41 and 42 in the above-described first embodiment.

In a case in which the secondary battery 100 of the present embodiment is manufactured, the electrode body 2 that has been subjected to an electrode body production step is set on the base substrate 111 in the first case 110 through conductive paste in the same manner as in the above-described first embodiment, and then the conductive paste is dried. Meanwhile, conductive paste, not shown in the figures, is applied onto the lower surface of the second case 130, and then the conductive paste is dried.

Subsequently, the first case 110 and the second case 130 are superimposed with the electrode body 2 sandwiched therebetween, and then the seal ring 112 in the first case 110 and the second case 130 are joined together by means of resistance seam welding, laser seam welding, or the like.

In the present embodiment as well, in the thermal pressing step, the firing of the electrode body 2 (the laminate) and the adhesion of the electrode body 2 and the respective cases 110 and 130 may be carried out at the same time. A seal ring 212 and a second case 230 may be joined together using a brazing filler metal or the like.

According to the present embodiment, a ceramics package is used for the exterior body 103, whereby it is possible to provide the secondary battery 100 which has excellent sealing properties or conduction properties and has a long service life and high reliability.

Third Embodiment

Figure 4:
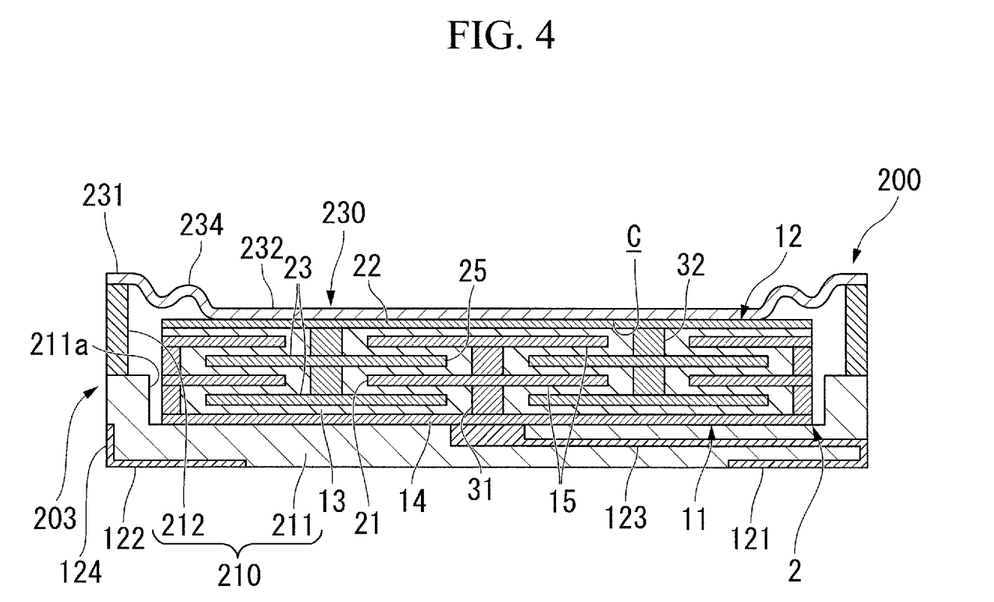
FIG. 4 is a view showing a secondary battery according to a third embodiment of the present invention and is a sectional view corresponding to FIG. 2.

Next, a third embodiment of the present invention will be described. In the following description, the same constitution as that of the above-described second embodiment will be given the same reference number and will not be described again. FIG. 4 is a sectional view of a secondary battery 200 according to the third embodiment.

In the secondary battery 200 shown in FIG. 4, a first case 210 in the exterior body 203 has a base substrate 211 and a seal ring 212.

The base substrate 211 has a recessed portion 211a in which the electrode body 2 is stored.

The seal ring 212 is joined to the upper surface of the base substrate 211. The seal ring 212 stores the electrode body 2 together with the recessed portion 211a in the base substrate 211 in the seal ring 212.

The second case 230 has a joining portion 231, a sandwiching portion 232, and a spring portion 234.

The joining portion 231 is located at the outer circumferential portion of the second case 230. The joining portion 231 is joined to the upper surface of the seal ring 212.

The sandwiching portion 232 is located at the inner circumferential portion of the second case 230. The sandwiching portion 232 sandwiches the electrode body 2 between the sandwiching portion 232 and the first case 210 (the base substrate 211).

The spring portion 234 couples the joining portion 231 and the sandwiching portion 232. The spring portion 234 is formed in a wave shape in a sectional view. The spring portion 234 urges the sandwiching portion 232 downwards (toward the first case 210). The secondary battery 200 of the present embodiment can be manufactured using the same method as in the above-described second embodiment.

According to this constitution, since the second case 230 has the spring portion 234 that urges the sandwiching portion 232 downwards, stress being exerted between the electrode body 2 and the exterior body 203 which is caused by a difference in thermal expansion coefficient therebetween is mitigated, and the generation of cracks in the electrode body 2 can be reliably suppressed. Furthermore, it is possible to absorb a change in the volume of the electrode body 2 and the tolerances of the electrode body 2 and the exterior body 203 which are caused during mounting by means of reflow or by charging and discharging using elastic deformation of the spring portion 234. Therefore, the generation of cracks in the electrode body 2 is suppressed, and thus adhesiveness between the respective cases 210 and 230 and the electrode body 2 is maintained, and conduction properties between the respective cases 210 and 230 and the electrode body 2 can be ensured.

Fourth Embodiment

Figure 5:
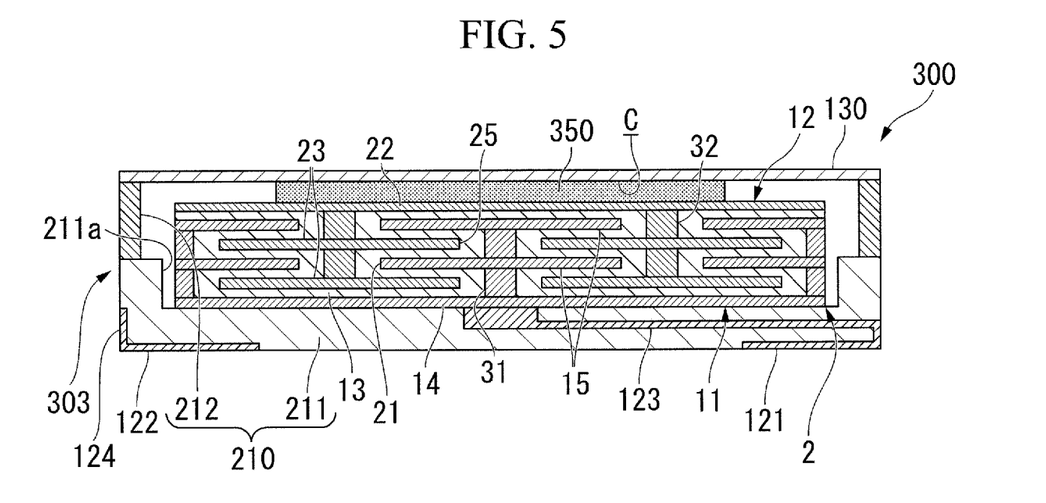
FIG. 5 is a view showing a secondary battery according to a fourth embodiment of the present invention and is a sectional view corresponding to FIG. 2.

Next, a fourth embodiment of the present invention will be described. In the following description, the same constitution as that of the above-described second embodiment will be given the same reference number and will not be described again. FIG. 5 is a sectional view of a secondary battery 300 according to the fourth embodiment.

In the secondary battery 300 shown in FIG. 5, an elastically deformable cushion material 350 is interposed between the second case 130 and the electrode body 2 (the negative electrode collection layer 22). The cushion material 350 is formed of, for example, a graphite fiber or the like. The cushion material 350 is closely attached to the lower surface of the second case 330 and the negative electrode collection layer 22.

Figure 6:
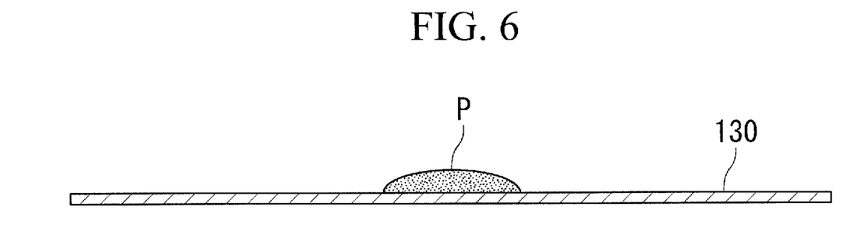
FIG. 6 is a view showing a step of a method for manufacturing the secondary battery according to the fourth embodiment and is a sectional view on a section perpendicular to a second case.
Figure 7:
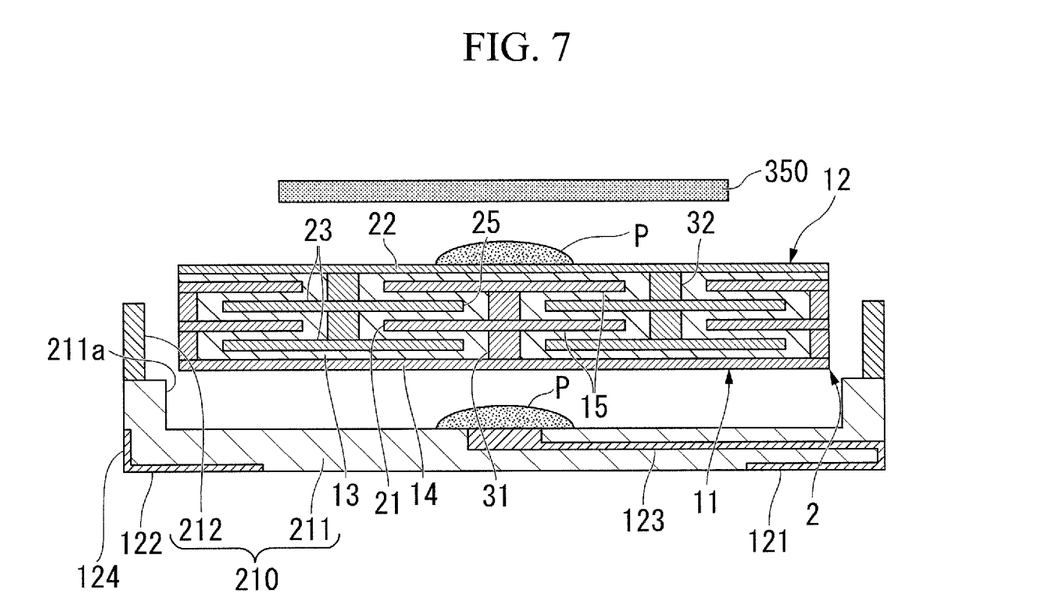
FIG. 7 is a view showing a step of a method for manufacturing the secondary battery according to the fourth embodiment and is a sectional view corresponding to FIG. 2.

FIGS. 6 and 7 are step views showing a method for manufacturing the secondary battery 300 according to the fourth embodiment. In the following description, a sealing step of sealing the electrode body 2 will be mainly described.

As shown in FIG. 7, the electrode body 2 is set on the base substrate 211 in the first case 210 through conductive paste P. Subsequently, the cushion material 350 is set on the electrode body 2 through the conductive paste P. After that, the first case 210, the electrode body 2, the cushion material 350, and the conductive paste P are heated, and the conductive paste P is dried.

On the other hand, as shown in FIG. 6, the conductive paste P is applied to the lower surface of the second case 130, and the conductive paste P is dried.

Subsequently, the first case 210 and the second case 130 are superimposed with the electrode body 2 sandwiched therebetween, and then the seal ring 212 in the first case 210 and the second case 130 are joined together by means of resistance seam welding, laser seam welding, or the like. In the present embodiment as well, in the thermal pressing step, the firing of the electrode body 2 (the laminate) and the adhesion of the electrode body 2, the respective cases 210 and 130, and the cushion material 350 may be carried out at the same time.

According to this constitution, since the cushion material 350 is interposed between the second case 130 and the electrode body 2, stress being exerted between the electrode body 2 and the exterior body 303 which is caused by a difference in thermal expansion coefficient therebetween is mitigated, and the generation of cracks in the electrode body 2 can be reliably suppressed. Furthermore, it is possible to absorb a change in the volume of the electrode body 2 and the tolerances of the electrode body 2 and the exterior body 203 which are caused during mounting by means of reflow or by charging and discharging using elastic deformation of the cushion material 350. Therefore, the generation of cracks in the electrode body 2 is suppressed, and thus adhesiveness between the respective cases 210 and 130 and the electrode body 2 is maintained, and conduction properties between the respective cases 210 and 130 and the electrode body 2 can be ensured.

In the above-described embodiment, a constitution in which the cushion material 350 is adhered to the first case 210 side and then the first case 210 and the second case 130 are joined together in the sealing step has been described, but the constitution is not limited thereto. That is, the cushion material 350 may be adhered to the second case 130 side, and then the first case 210 and the second case 130 may be joined together.

In the above-described embodiment, a constitution in which the cushion material 350 is interposed between the second case 130 and the electrode body 2 has been described, but the constitution is not limited thereto. That is, the cushion material 350 may be interposed, at one of or both of, between the first case 210 and the electrode body 2 (the positive electrode collection layer 14), and between the second case 130 and the electrode body 2.

Fifth Embodiment

Figure 8:
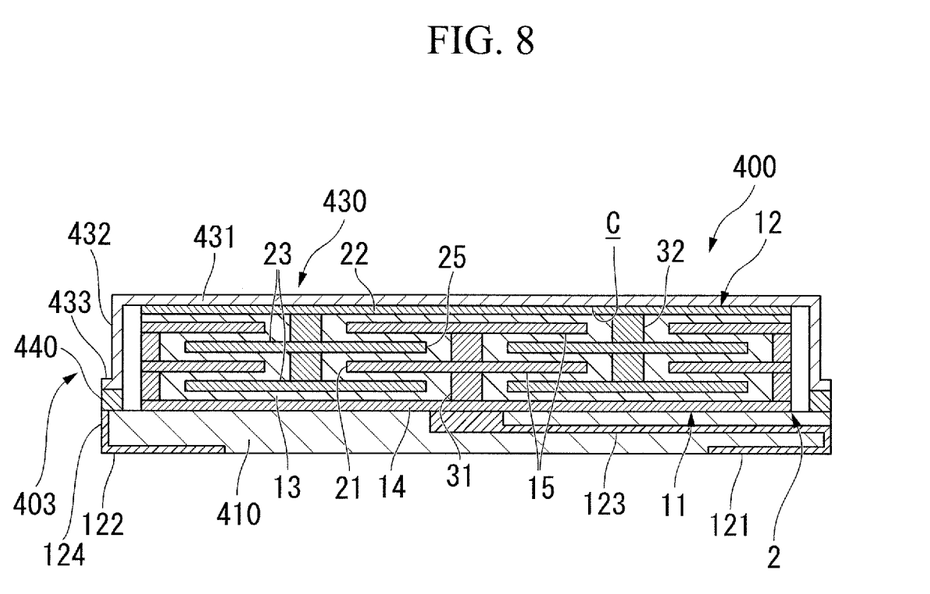
FIG. 8 is a view showing a secondary battery according to a fifth embodiment of the present invention and is a sectional view corresponding to FIG. 2.

Next, a fifth embodiment of the present invention will be described. In the following description, the same constitution as that of the above-described second embodiment will be given the same reference number and will not be described again. FIG. 8 is a sectional view of a secondary battery 400 according to the fifth embodiment.

In the secondary battery 400 shown in FIG. 8, an exterior body 403 and a first case 410 are formed of a ceramic material. The first case 410 is formed in a flat plate shape.

The second case 430 is formed of a conductive metallic material. The second case 430 is formed in a hat-shape in a sectional view. Specifically, the second case 430 has a sandwiching portion 431, a surrounding wall 432, and a flange portion 433.

The sandwiching portion 431 is formed in a flat plate shape. The sandwiching portion 431 sandwiches the electrode body 2 in the lamination direction between the sandwiching portion 431 and the first case 410.

The surround wall 432 is provided so as to extend downwards from the outer circumferential edge of the sandwiching portion 431. The surrounding wall 432 surrounds the circumference of the electrode body 2.

The flange portion 433 protrudes outside from the lower end edge of the surrounding wall 432.

A sealing member 440 is formed in a frame shape that surrounds the circumference of the electrode body 2 in the outer circumferential portions of the respective cases 410 and 430. The sealing member 440 joins the outer circumferential portions of the first case 410 and the flange portion 433 in the second case 430. The sealing member 440 is constituted of the same metallic material as for the respective cases 41 and 42 in the above-described first embodiment.

According to this constitution, since it is possible to store the electrode body 2 in the second case 430 formed of a metallic material, the costs can be reduced compared with a constitution in which a recessed portion is formed in the first case 410 formed of a ceramic material.

Hitherto, the preferred embodiments of the present invention have been described, but the present invention is not limited to these embodiments alone. Within the scope of the gist of the present invention, additions, omissions, and substitutions of constitutions and changes thereof are allowed. The present invention is not limited by the above description and is limited only by the scope of the accompanying claims.

For example, in the above-described embodiments, the secondary batteries have been described as examples of electrochemical cells, but the electrochemical cells may be capacitors or primary batteries. Materials used for the positive electrode layer 11 or the negative electrode layer 12 and the solid electrolyte layer 13, the number of layers laminated, the layout of the via 31 and 32, and the like can be appropriately changed.

In the above-described embodiments, constitutions in which the planar shape of the exterior body is a rectangular shape have been described, but the constitution is not limited thereto, and the planar shape can be appropriately designed or changed to a circular shape or the like.

For the component of the exterior body, a variety of materials can be used as long as the materials have a thermal expansion coefficient of $10 \times 10^{-6}/°$ C. or lower.

What is claimed is:

1. An electrochemical cell comprising:
    an all-solid-state electrode body having a positive electrode layer and a negative electrode layer laminated together through a solid electrolyte; and
    an exterior body having a cavity enclosing the electrode body,
    the exterior body including:
    a first case comprising a flat plate and a second case comprising a flat plate and sandwiching the electrode body, the first and second cases having inner surfaces facing the electrode body, and
    a sealing member joining the first case and the second case only at the inner surfaces of respective outer ends thereof and defining the cavity, such that the first and second cases are thermally fused together, and
    wherein thermal expansion coefficients of the electrode body, the first case, the second case, and the sealing member are all $10 \times 10^{-6}/°$ C. or lower, and one of the first and second cases are thermally fused to the electrode body by a thermosetting conductive paste,
    a planar elastically deformable cushion material is closely attached to the electrode body and the first case, or to the electrode body and the second case by the thermosetting conductive paste, and
    the elastically deformable cushion material mitigates stress being exerted between the electrode body and the exterior body due to a difference in thermal expansion coefficient therebetween.

2. The electrochemical cell according to claim 1, wherein the first case and the second case are composed of a metallic material, and the sealing member is composed of a glass material.

3. The electrochemical cell according to claim 1, wherein the first case includes a base substrate composed of a ceramic material, and the second case and the sealing member are composed of a metallic material.

4. The electrochemical cell according to claim 1, wherein the sealing member is attached to the electrode body.

5. The electrochemical cell according to claim 1, wherein the elastically deformable cushion material is formed of graphite fiber.

6. An electrochemical cell comprising:
an all-solid-state electrode body having:
a plurality of positive electrode layers and a plurality of negative electrode layers laminated together through a solid electrolyte;
at least one relief hole in at least one of the plurality of negative electrode layers; and
at least one positive electrode via connecting at least two of the plurality of positive electrode layers and passing through the at least one relief hole in the at least one of the plurality of negative electrode layers, wherein the outer diameter of the at least one positive electrode via is smaller than an inner diameter of the at least one relief hole; and
an exterior body having a cavity enclosing the electrode body,
the exterior body including:
a first case comprising a flat plate and a second case comprising a flat plate and sandwiching the electrode body, the first and second cases having inner surfaces facing the electrode body, and
a sealing member joining the first case and the second case only at the inner surfaces of respective outer ends thereof and defining the cavity, such that the first and second cases are thermally fused together, and
wherein thermal expansion coefficients of the electrode body, the first case, the second case, and the sealing member are all $10 \times 10^{-6}/°$ C. or lower, and one of the first and second cases are thermally fused to the electrode body by a thermosetting conductive paste.

7. The electrochemical cell according to claim 6, wherein the first case and the second case are composed of a metallic material, and the sealing member is composed of a glass material.

8. The electrochemical cell according to claim 6, wherein the first case includes a base substrate composed of a ceramic material, and the second case and the sealing member are composed of a metallic material.

9. The electrochemical cell according to claim 6, wherein the second case includes:
a joining portion in an outer circumferential portion of the second case and joined to the sealing member,
a sandwiching portion in an inner circumferential portion of the second case and sandwiching the electrode body with the first case; and
a spring portion that couples the joining portion and the sandwiching portion and urges the sandwiching portion toward the first case.

10. The electrochemical cell according to claim 6, wherein an elastically deformable cushion material is attached to the electrode body and the first case, or to the electrode body and the second case by the thermosetting conductive paste.

11. The electrochemical cell according to claim 10, wherein the elastically deformable cushion material is formed of graphite fiber.

12. The electrochemical cell according to claim 6, wherein the sealing member is attached to the electrode body.

* * * * *